United States Patent
Tanzer

Patent Number: 5,429,221
Date of Patent: Jul. 4, 1995

[54] ALL-WHEEL DRIVE FREE-WHEEL MECHANISM FOR A MOTOR VEHICLE

[75] Inventor: John H. Tanzer, Troy, Mich.

[73] Assignee: Ford Motor Company, Dearborn, Mich.

[21] Appl. No.: 71,884

[22] Filed: Jun. 7, 1993

[51] Int. Cl.⁶ .................... B60K 17/354; F16D 11/14
[52] U.S. Cl. .................... 142/85 V; 180/247
[58] Field of Search ............. 180/247; 475/234, 237, 475/269, 250; 192/85 V, 85 C

[56] References Cited

U.S. PATENT DOCUMENTS

| | | | |
|---|---|---|---|
| Re. 28,545 | 9/1975 | Harris | 60/531 X |
| 3,123,169 | 3/1964 | Young et al. | 180/247 |
| 3,756,083 | 9/1973 | Tatsutomi et al. | 60/23 |
| 3,782,121 | 1/1974 | Marcoux et al. | 60/527 |
| 3,805,528 | 4/1974 | Huebscher | 60/530 |
| 3,886,513 | 5/1975 | Smith et al. | 60/530 |
| 3,991,572 | 11/1976 | Huebscher et al. | 60/531 X |
| 4,029,941 | 6/1977 | Huebscher et al. | 60/531 X |
| 4,070,859 | 1/1978 | Sobecks | 60/530 |
| 4,070,946 | 1/1978 | Sandvik et al. | 91/25 |
| 4,104,507 | 8/1978 | Tisone et al. | 60/531 X |
| 4,271,722 | 6/1981 | Campbell | 475/86 |
| 4,341,281 | 7/1982 | Nagy | 180/247 |
| 4,373,604 | 2/1983 | Lunn et al. | 180/247 |
| 4,381,828 | 5/1983 | Lunn et al. | 180/247 |
| 4,407,387 | 12/1983 | Lindbert | 180/247 |
| 4,452,331 | 6/1984 | Lunn et al. | 180/247 |
| 4,699,235 | 10/1987 | Anderson | 180/247 |
| 4,747,463 | 5/1988 | Yoshinaka et al. | 180/247 |
| 4,779,698 | 10/1988 | Iwata | 192/85 V |
| 4,928,782 | 5/1990 | Sommer | 180/247 X |
| 5,004,086 | 4/1991 | Petzold et al. | 192/85 C |
| 5,042,631 | 8/1991 | Ellenberger et al. | 192/85 C |

FOREIGN PATENT DOCUMENTS

| | | | |
|---|---|---|---|
| 1142284 | 1/1963 | Germany | 192/85 C |
| 133237 | 5/1990 | Japan | 180/247 |
| 404230422 | 8/1992 | Japan | 180/247 |

Primary Examiner—Dirk Wright
Assistant Examiner—Khoi Q. Ta
Attorney, Agent, or Firm—Frank G. McKenzie; Roger L. May

[57] ABSTRACT

A free wheel mechanism for alternately engaging and disengaging a coupler (102) that driveably connects and release an axle shaft (92) to an intermediate shaft (78), which is driven by one output of a axial differential mechanism (30). A vacuum motor (116) moves an actuating shaft (118) substantially parallel to the axle shaft between engaged and disengaged positions of the actuator. A lever (124), connected to the actuating shaft for axial displacement, is pinned to a pivot shaft (126) supported rotatably on the differential housing. A shift fork (144), fixed to the pivot shaft for rotation with the pivot shaft, includes arms (146, 148) that extend radially and engage the sliding coupler (102), which is supported on spline teeth (94) at the end of the intermediate shaft for sliding engagement with spline teeth (98) formed on the outer surface of a connecting hub (96) fixed to the axle shaft. Axial displacement of the actuating shaft (118) turns the pivot shaft (126) and causes the shift fork (144) to slide the coupler (102) axially between the engaged and disengaged positions.

7 Claims, 4 Drawing Sheets

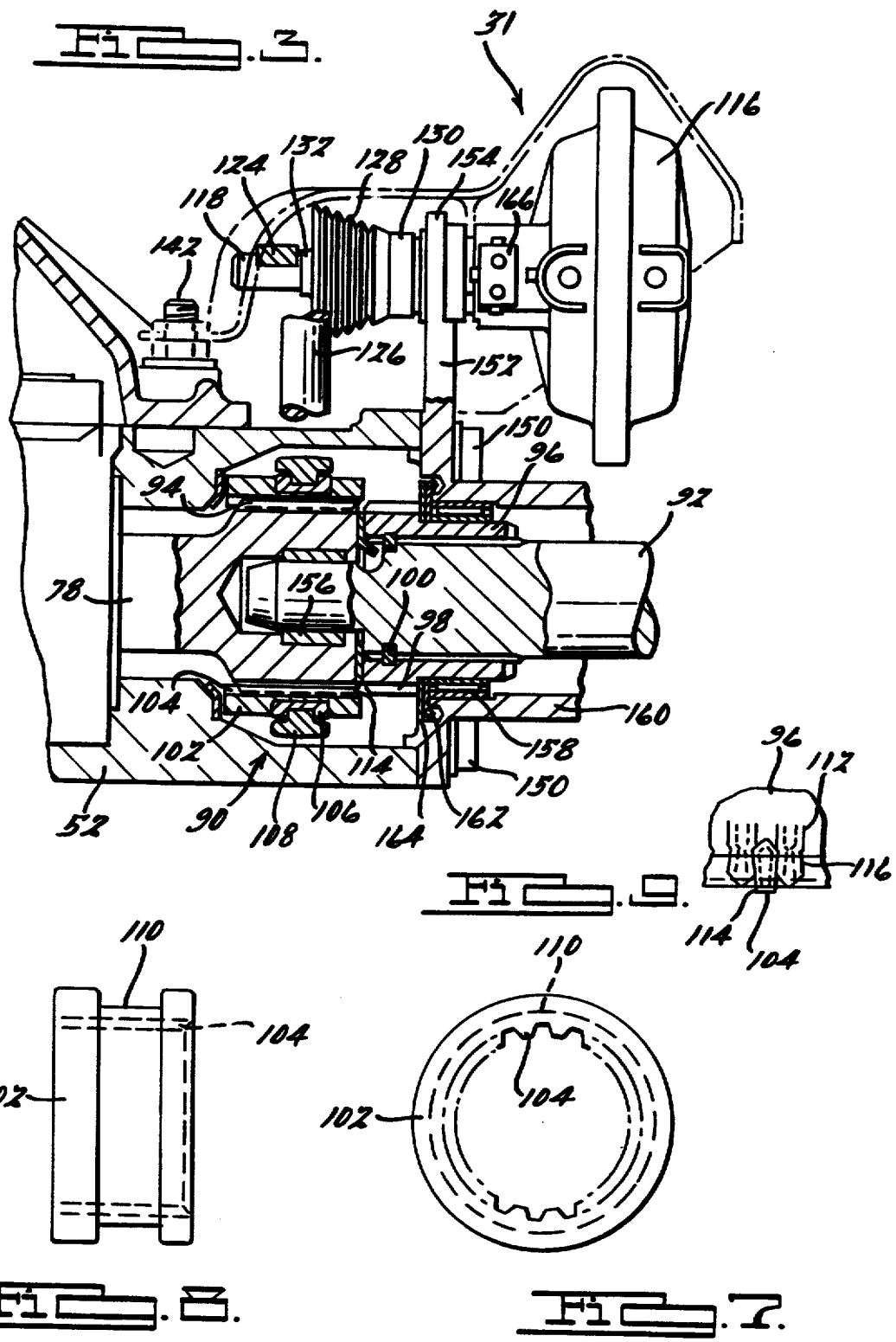

5,429,221

ALL-WHEEL DRIVE FREE-WHEEL MECHANISM FOR A MOTOR VEHICLE

FIELD OF THE INVENTION

This invention relates to the field of drive axles for motor vehicles. More particularly, the invention pertains to a device for connecting and disconnecting an axle shaft and the output of a differential mechanism in a part-time four-wheel drive powertrain.

DESCRIPTION OF THE PRIOR ART

The powertrain for a part-time four-wheel drive motor vehicle includes a transfer case driven from an engine through a multiple speed transmission. The transfer case includes a first output shaft continuously connected to a first set of drive wheels through an axle differential and two axle shafts driven from the differential output. The transfer case includes a second output that drives a second axle differential mechanism or disconnects the transfer case input from the second differential mechanism depending upon the engaged and disengaged state of a clutch located in the transfer case.

When operating in the two-wheel drive mode, the set of drive wheels that is disconnected from the transmission output shaft can drive the components of the powertrain located between the non-driven wheels and the transfer case. In order to prevent this difficulty, the wheels of the axle that are driven from the transfer case only in four-wheel drive mode are equipped with hub locks, which engage and release the wheels and the axle shafts that are driven from the associated differential mechanism. Hub locks are usually engaged manually or can be engaged automatically provided a suitable power source and actuation mechanism are available.

U.S. Pat. No. 4,341,281 describes another solution to the problem in which only one of the split axles of the part-time axle assembly is disconnected from the corresponding output of the differential mechanism, usually one of the side bevel gears of an epicyclic differential mechanism. To produce this effect, an actuator such as a vacuum motor has an output connected to a shift fork that moves axially parallel to the axle shaft and carries a sliding coupler, which produces a disengageable driveable connection between the side bevel gear and the axle shaft. In this arrangement, the shift fork and coupler move exactly the same distance as the actuator of the vacuum motor, and that movement is entirely linear and parallel to the axial shaft. Because the actuator moves on an axis that is offset from that of the shift fork and coupler, it applies a movement tending to rotate the shift fork on the shaft that supports it. Also, the arrangement requires a dynamic linear seal between the shift fork and the housing, thereby presenting a difficult and fault-ridden sealing problem.

SUMMARY OF THE INVENTION

It is an object of the present invention to provide an improved free-wheel mechanism in which a vacuum motor or other actuator transmits motion and force through a lever to a pivot shaft, which pivots about an axis perpendicular to the linear travel of the actuator. The mechanism produces pivoting motion of the shift fork connected to the coupler of a clutch that produces engagement and disengagement of an axle shaft and the output of a differential mechanism. Spline teeth on the clutch coupler and spline teeth on the outer surface of the axle shaft engaged by the coupler are mutually interlocking to prevent inadvertent disengagement and facilitate engagement.

The free-wheel mechanism of the present invention permits the location of the vacuum motor or other actuator to be changed readily to suit the limited space available near the axle shaft of a motor vehicle. The free-wheel mechanism of my invention permits a reliable radial seal to be provided on the pivot shaft rather than a dynamic linear seal required in the prior art to seal a conventional shift fork that moves linearly with the actuator.

In realizing these advantages, the free-wheel mechanism of this invention is suited for use in a powertrain that includes a first axle shaft directed transversely with respect to the longitudinal axis of the vehicle and an intermediate shaft aligned with the axle shaft and driveably connected to the output of an axle differential. A vacuum motor producing linear displacement of an actuator parallel to the axle shaft is driveably connected to a lever assembly having a lever arm carried on a pivot shaft supported for rotation on the casing of the differential mechanism. The pivot shaft rotates about its axis due to movement of the linear-actuator transmitted to the pivot shaft by the lever arm. The pivot shaft also rotatably supports a shift fork having arms that extend radially from the axis of the pivot shaft to a clutch coupler that moves parallel to the axial shaft in response to pivoting movement of the shift fork and pivot shaft. The coupler includes internal spline teeth continually engaged with external spline teeth formed on an intermediate shaft. The spline teeth of the coupler are suited to engage and disengage external spline teeth formed at the inboard and the axle shaft.

BRIEF DESCRIPTION OF THE DRAWINGS

FIG. 3 is a cross section similar to that of FIG. 2 showing components of FIG. 2 in greater detail.

FIG. 7 is an end view of a sliding coupler.

FIG. 8 is a top view of a sliding coupler.

FIG. 9 is a detail view showing teeth of the sliding coupler and connecting hub in meshing, driving contact.

DESCRIPTION OF THE PREFERRED EMBODIMENT

Figure 1:
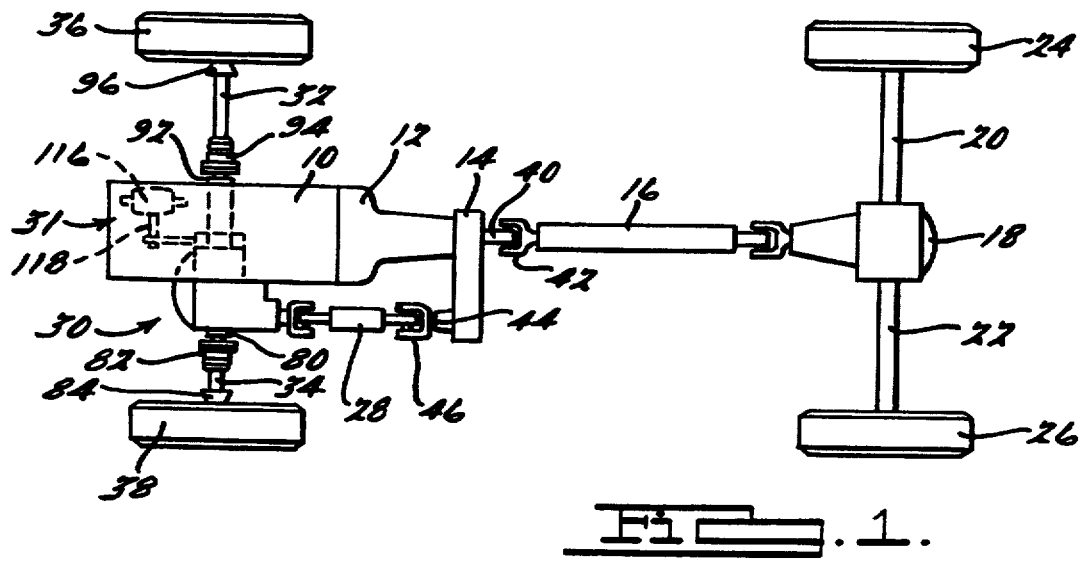
FIG. 1 is a schematic plane view of a powertrain for a four-wheel drive vehicle to which the free wheel mechanism of the present invention can be applied.

Referring now to FIG. 1, the powertrain of a part-time, four-wheel drive vehicle includes an engine 10, transmission 12, transfer case 14, rear drive shaft 16, rear differential 18, right and left rear axle shafts 20, 22, rear drive wheels 24, 26, front drive shaft 28, front axle differential 30, free wheel mechanism 31, right-hand and left-hand front axle shafts 32, 34, and front drive wheels 36, 38.

The transfer case transmits power under normal operating conditions to a rear output shaft 40, which is driveably connected through a universal joint 42 to rear drive shaft 16. When four-wheel drive is required, the transfer case directs power also to a front output shaft 44, which is driveably connected through a universal joint 46 to front drive shaft 28. Rear drive shaft 16 is driveably connected by an epicyclic differential mechanism which transmits power to the rear drive wheels 24, 26 and permits those wheels to turn at mutually different speeds.

Figure 2:
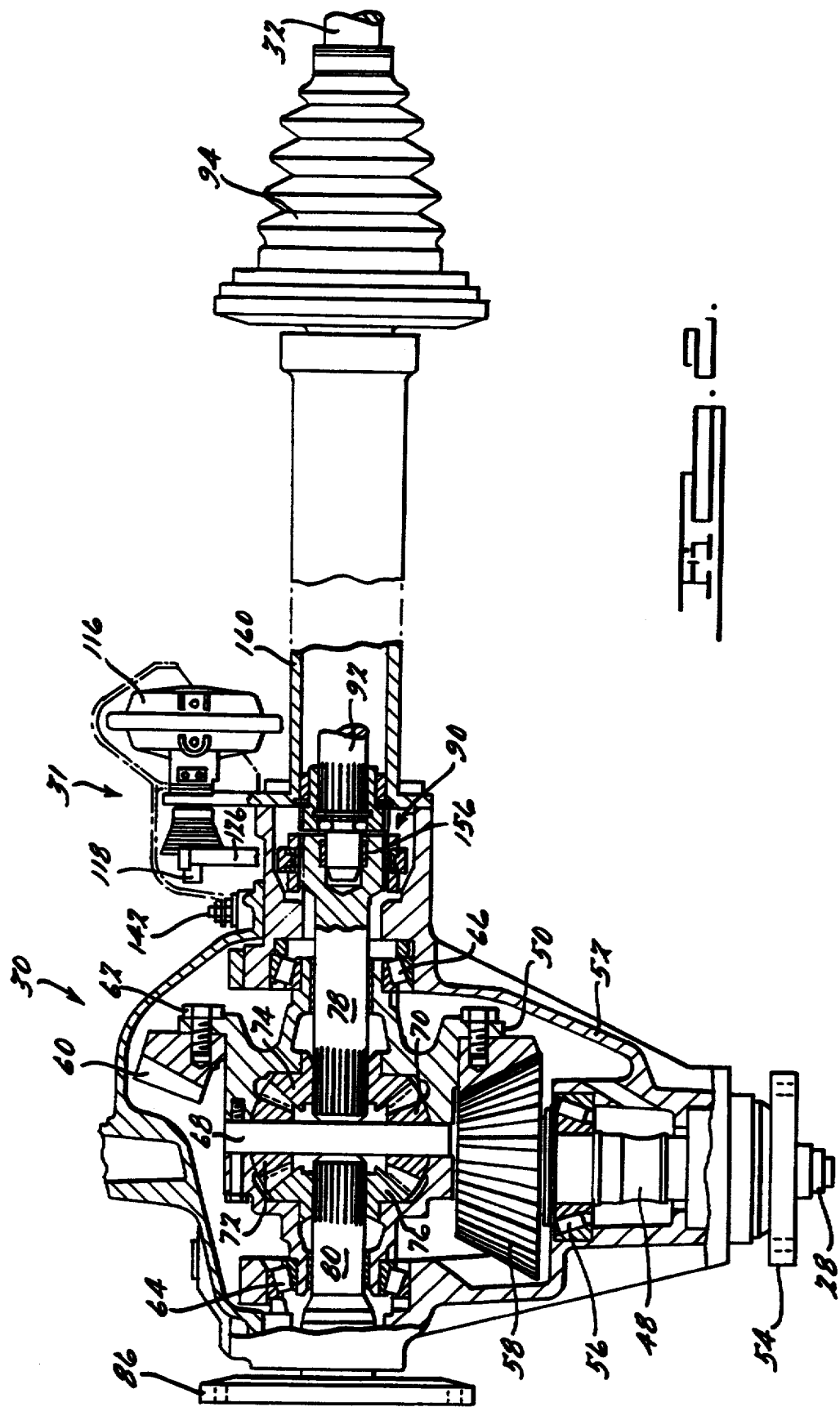
FIG. 2 is a partial cross section through a horizontal plane of an axle differential and the free-wheel mechanism of my invention.

The front differential mechanism 30, and free wheel mechanism 31 are shown in detail in FIG. 2. The front differential 30 includes a drive shaft 48 and carrier 50 located in a housing 52 rotatably mounted and supported on mutually perpendicular axes. A connection is made at a flange 54 between front drive shaft 28 and the differential input shaft 48, which is rotatably supported about a central axis on housing 52 by bearing 56. A bevel pinion 58 is driveably connected to input shaft 48 and is in continuous meshing engagement with bevel gear 60 connected by bolts 62 to the carrier 50 for rotation about a lateral axis disposed substantially perpendicular to the axis of input shaft 48. Bearings 64, 66 rotatably support carrier 50 on the differential housing 52.

A spindle 68, fixed to differential carrier 50 at a position substantially perpendicular to the axle shafts 80, 92, drives bevel pinions 70, 72 in rotation about the axis of the axle shafts. Pinions 70, 72 are in continuous meshing engagement with side bevel gears 74, 76, which are fixed by spline connections to intermediate shaft 78, located at the right-hand side of spindle 68 and axle shaft 80. Left-hand, front axle shaft 34, a half shaft having a constant velocity joint 82, 84 at each end, is joined by a bolted flange 86 to shaft 80.

The differential mechanism described with reference to FIG. 2 includes an epicyclic gearset but it could have a planetary gearset or a gearset of another type able to deliver torque to each of the two lateral outputs, and the outputs must be able to turn at mutually different speeds.

The free-wheel mechanism 31 includes a mechanical clutch 90 that alternately engages and releases a driveable connection between intermediate shaft 78 and the right-hand front axle shaft 92, which is driveably connected through a half shaft 32 to drive wheel 36, the half shaft having a constant velocity joint 94, 96 at each of its ends.

Although the free-wheel mechanism 31 is shown in the drawings located on the right-hand side of the differential mechanism 30, it can produce identical advantages located on either side of the differential mechanism.

Intermediate shaft 78 has an external spline 94 formed on its surface at its outboard axial end. The inboard end of axle shaft 92 carries a connecting hub 96, which is formed with a spline 98 substantially identical to the spline 94 on the outer surface of the intermediate shaft. A snap ring 100 driveably secures the connection between axle shaft 92 and connecting hub 96. A sliding coupler 102 has a spline 104 formed on its inner surface, adapted to engage the splines on hub 96 and intermediate shaft 78 and to slide axially outboard into engagement with hub 96 from the position shown in FIG. 3 and to slide inboard out of engagement with the hub. Coupler 102 is continually engaged with spline 94 of the intermediate shaft. A sliding shoe 106 is fitted within recess on the outer surface of coupler 102. Fingers 108 at the end of shift fork arms engage recesses at diametrically opposite sides of shoe 106. Preferably shoe 106 is formed of VESPEL, a material produced and commercially available from DuPont Corporation of Wilmington, Del.

FIGS. 7 and 8 show recess 110 formed on the outer surface of coupler 102, within which shoe 106 is fitted, and the spline 104 formed on the inner surface of coupler 102.

FIG. 9 shows the nature of the engagement between spline teeth 112 formed on the outer surface of connecting hub 96 and spline teeth 104 formed on the inner surface of sliding coupler 102. As FIG. 3 shows the tips of the teeth 104, 112 are tapered axially and radial, and, as FIG. 9 shows, the teeth are pointed in order to facilitate mutual engagement. The lateral surfaces 116 of the external teeth 112 of hub 96 are formed with axially tapered recesses 116, the lateral surfaces of adjacent hub teeth being spaced apart a distance that is wider in the angular circumferential direction at the axial inner end of recesses 116 than the spacing between adjacent teeth of the coupler at the axially outer end of the recesses. The lateral surfaces 114 of teeth 104 are also tapered axially substantially parallel to the lateral faces of teeth 112 of coupler 96. FIG. 9 shows that when the spline teeth 104 of sliding coupler 102 are engaged between the teeth 112 of connecting hub 96, teeth 104 are restrained against axial movement due to the wedging effect produced by the mutually parallel, axially tapered lateral faces 114, 116 of the engaged teeth 104, 112. The nature of this engagement prevents inadvertent axial displacement and disengagement of the coupler and hub.

Figure 4:
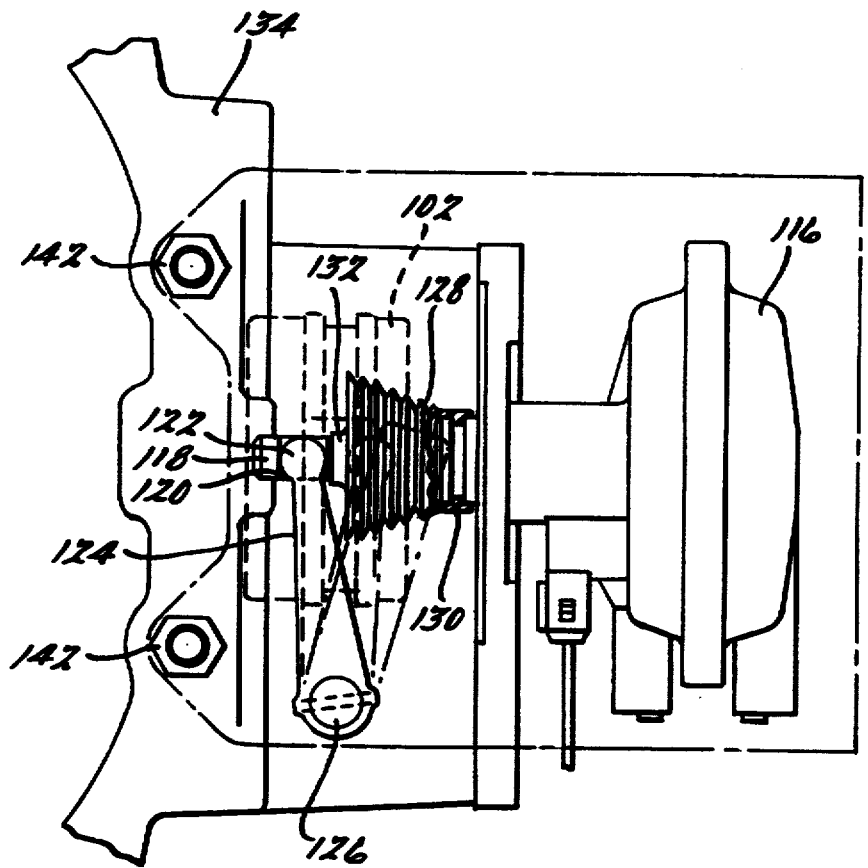
FIG. 4 is a front view of the components of FIG. 3.
Figure 5:
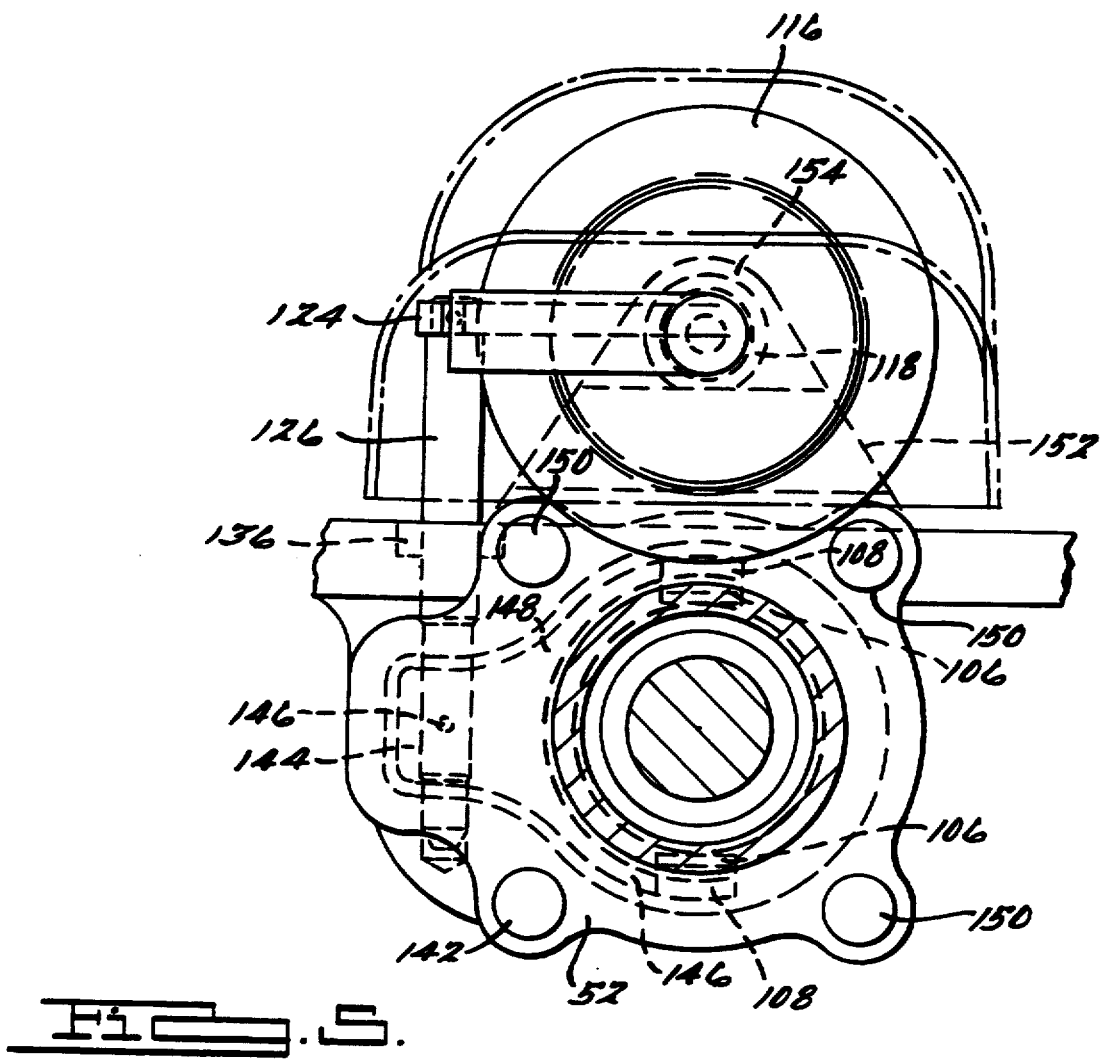
FIG. 5 is an end view of the components of FIG. 3.
Figure 6:
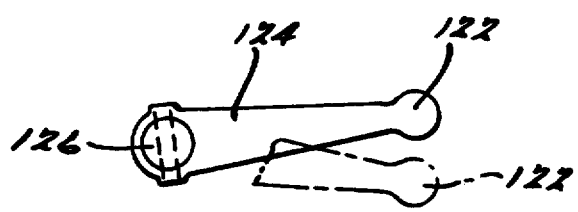
FIG. 6 is a view taken parallel to the axis of the pivot shaft showing the pivot lever and its range of motion.

Referring now to FIGS. 3–5, the free-wheel mechanism includes a vacuum motor 116, having an output actuator 118 disposed for displacement substantially parallel to axle shaft 92. Actuator 118 is formed with a slot 120, into which is fitted the rounded end 122 of a lever arm 124, which is fixed to a pivot shaft 126. The axis of shaft 126 is substantially perpendicular to that of intermediate shaft 78 and axle shaft 80. A flexible boot 128 is supported at 130 at one end of the housing of vacuum motor 116 and at 132 on the end of actuator 118 so that, as the actuator moves axially between the extremities of its travel shown in FIG. 4, the boot covers and seals the end of the vacuum motor against entrance of contaminants.

Pivot shaft 126 is supported for rotation on housing 52 about an axis substantially perpendicular to the axis of intermediate shaft 78 and axle shaft 92 and is sealed on the housing by rotary seal 136.

A shift fork 144 is pinned at bolted connection 146 to the lower end of pivot shaft 126 so that the shift fork rotates as a unit with the pivot shaft. The shift fork includes an upper arm 148 and a lower arm 146, which extend radially outward from the axis of pivot shaft 126 to fingers 108, which are seated within the recesses formed in the sliding shoes 106, fitted on the outer surface of sliding coupler 102.

A tapered plate 152, mounted by connecting bolts 150 on the differential carrier housing 52, extends forward and provides a lug 154, on which vacuum motor 116 is supported. The position of lug 154 can be altered readily by rotating plate 152 about the axis of axle shaft 92 to any position where the vacuum motor can be located with interference with other equipment.

The inboard end of axle shaft 92 is supported on a needle bearing 156 located in a pocket recess formed on the radially outer end of intermediate shaft 78. Connecting hub 96 is rotatably supported on a needle bearing 158 located between the inner surface of a cylindrical housing 160 that extends outward from differential carrier housing 52 and an outer surface of coupler 96.

Located adjacent needle bearing 158 is a bimetallic steel and bronze washer 162 and a hard steel washer 164, located between washer 162 and a shoulder formed on the outer surface of coupler 96.

An electrical connector 166 carried on the vacuum motor housing carries electrical power to a limit position switch whose output is an electrical signal representing the engaged or disengaged state of axle shaft 92 and intermediate shaft 78 in accordance with the axial position of the actuator 118 and the angular position of pivot shaft 126, shift fork 144 and sliding coupler 102.

Vacuum motor 116 is pneumatically connected to the intake side of an internal combustion engine and to a source of elevated pressure, the vacuum and pressure sources being applied on opposite sides of a piston connected to actuator 118, whereby the actuator moves due to the effect of pressure and vacuum forces on the piston.

I claim:

1. A free wheel mechanism for a drive axle of a motor vehicle, comprising:

a first axleshaft directed transversely with respect to a longitudinal axis of the vehicle;

a second axleshaft substantially coaxial with the first axleshaft, extending outboard from a longitudinal axis in a direction opposite to that of the first axleshaft;

an intermediate shaft substantially aligned with the second axleshaft, located between the first and second axleshafts;

differential means for transmitting power from a drive shaft to the first axleshaft and intermediate shaft and permitting one of said first axleshaft and intermediate shaft to rotate faster than the other of said shafts;

clutch means for connecting and disconnecting the intermediate shaft and second axleshaft;

actuating means producing linear displacement of an actuator alternately in opposite directions; and lever means connected to the actuator and clutch means, supported for rotation about an axis offset from the actuator and clutch means, for moving the clutch means along the axis of the intermediate shaft and second axleshaft in response to displacement of the actuator, whereby the clutch means connects and disconnects the intermediate shaft and second axleshaft.

2. The mechanism of claim 1 wherein:

the intermediate shaft includes a first spline;

the second axleshaft includes a second spline adjacent and aligned with the first spline; and the clutch means comprises a collar displaceable along the axis of the intermediate shaft and second axleshaft, having a spline engaged with the first spline and adapted to engage and release the second spline.

3. The mechanism of claim 1 wherein the actuating means comprises:

a vacuum motor having a actuator supported for displacement in opposite directions along an axis substantially transverse to the longitudinal axis of the vehicle, displacement of the actuator in one direction being responsive to vacuum at the intake side of an internal combustion engine.

4. A free wheel mechanism for a drive axle of a motor vehicle, comprising:

a first axleshaft directed laterally with respect to a longitudinal axis of the vehicle;

a second axleshaft substantially coaxial with the first axleshaft, extending outboard from a longitudinal axis in a direction opposite to that of the first axleshaft;

an intermediate shaft substantially aligned with the second axleshaft, located between the first and second axleshafts;

a drive shaft directed substantially parallel to a longitudinal axis;

differential means for transmitting power laterally to the first axleshaft and intermediate shaft from the drive shaft;

clutch means moveable along the axis of the intermediate shaft and second axleshaft, for connecting and disconnecting mutually the intermediate shaft and second axleshaft;

actuating means producing linear displacement of an actuator alternately in opposite directions along an substantially laterally directed axis; and lever means connected to the actuator and clutch means, supported for rotation about an axis offset from the actuator and clutch means, said axis directed substantially perpendicular to the longitudinal axis and lateral axis, for moving the clutch means along the axis of the intermediate shaft and second axleshaft in response to displacement of the actuator, whereby the clutch means connects and disconnects the intermediate shaft and second axleshaft.

5. The mechanism of claim 4 wherein:

the intermediate shaft includes a first spline;

the second axleshaft includes a second spline adjacent and aligned with the first spline;

the clutch means comprises a collar displaceable along the axis of the intermediate shaft and second axleshaft, having a spline engaged with the first spline and adapted to engage and release the second spline.

6. The mechanism of claim 4 wherein the actuating means comprises:

a vacuum motor having a actuator Supported for displacement in opposite directions along an axis substantially transverse to the longitudinal axis of the vehicle, displacement of the actuator in one direction being responsive to vacuum at the intake side of an internal combustion engine.

7. The mechanism of claim 4 wherein:

the intermediate shaft includes a first spline;

the second axleshaft includes a second spline adjacent and aligned with the first spline;

the clutch means comprises a collar displaceable along the axis of the intermediate shaft and second axleshaft, having a spline engaged with the first spline and adapted to engage and release the second spline;

the actuating means comprises a vacuum motor having a actuator supported for displacement in opposite directions along an axis substantially transverse to the longitudinal axis of the vehicle, displacement of the actuator in one direction being responsive to vacuum at the intake side of an internal combustion engine.

* * * * *